CONTROL OF CARRIER TRANSMISSION SYSTEMS BY PILOT FREQUENCIES

Filed June 7, 1947 2 SHEETS—SHEET 1

Inventor
FRANK CORAM WRIGHT
KENNETH GEORGE HODGSON
ALLEMAN HOLLY ROCHE
By Philip M. Bolton
Attorney Inventor
FRANK CORAM WRIGHT
KENNETH GEORGE HODGSON
ALLEMAN HOLLY ROCHE
By Philip M. Bolton
Attorney Patented Jan. 27, 1953 2,626,993

UNITED STATES PATENT OFFICE 2,626,993

CONTROL OF CARRIER TRANSMISSION SYSTEMS BY PILOT FREQUENCIES

Frank Coram Wright, Kenneth George Hodgson, and Alleman Holly Roche, London, England, assignors to International Standard Electric Corporation, New York, N. Y.

Application June 7, 1947, Serial No. 753,352
In Great Britain January 10, 1939

Section 1, Public Law 690, August 8, 1946
Patent expires January 10, 1959

8 Claims. (Cl. 178—44)

The present invention relates to control arrangements of transmission systems employing pilot frequencies and more particularly, though not specifically to the gain and equalisation control of carrier wave transmission systems.

An object of the invention is to provide means for gain and equalisation control by the utilisation of two or more pilot frequencies, one of which may be the carrier frequency.

Another object of the invention is to eliminate the effects of the pilot frequency receiving circuits on the gain characteristic of the system.

A further object is to provide means for the automatic control of gain and equalisation utilising two or more pilot frequencies.

In the application of carrier wave systems to open wire circuits, trouble is often experienced due to the change in attenuation of the open wire line caused by changes in weather conditions. This change is more important still in the case of broadcast circuits where it is desired to keep the gain-frequency characteristic substantially straight over a wide range of frequencies. The present invention provides means of overcoming this difficulty.

According to a feature of the present invention, in a transmission system a plurality of pilot frequencies are employed and one of said pilot frequencies is a carrier frequency. A plurality of pilot frequencies may conveniently be employed for controlling the gain and equalisation devices of the system, for instance, as already mentioned, to maintain the gain-frequency characteristic of the system substantially straight over a wide range of frequencies.

According to another feature of the invention, in cases where each pilot frequency controls automatically the gain and equalisation of the system, the pilot frequencies operate to provide correction in a predetermined order, each one being prevented from operating until the correction by the preceding pilot has been completed. In the case where two pilot frequencies are used, means is provided for preventing the second pilot frequency from becoming effective until the correction of the first pilot frequency is completed. This means may be made to depend upon the signal level at one of the pilot frequencies, and when this level is brought to a predetermined value, the other pilot frequency becomes effective to readjust the level at that frequency.

One of the plurality of frequencies may be employed for synchronisation purposes between, for instance, the master oscillators at the sending and receiving ends of the system, and in addition that same pilot frequency may be employed for controlling the gain and/or equalisation devices of the system, and the other pilot frequencies may only be transmitted when the level of the signals on the system falls below a predetermined value.

The invention will be better understood from the following description taken in conjunction with the accompanying drawings which show schematically and by way of example, transmission systems embodying the invention.

The invention will be described with reference to an open wire carrier broadcast system but it is not intended to limit the invention to this particular type of system. In one embodiment it is proposed to transmit two pilot frequencies, one of which is the carrier frequency. This will be more fully described with reference to Fig. 1.

Figure 1:
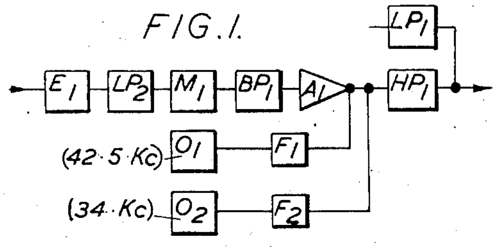
Fig. 1 is a schematic diagram of the sending end of an open wire transmitting line.

In Fig. 1, the voice input enters the equaliser $E_1$ and passes through the low pass filter $LP_2$ to the modulator $M_1$ where it is modulated by a frequency from the oscillator $O_1$ which may, for example, be 42.5 kc. From the modulator $M_1$ the signals pass through the band filter $BP_1$ which is arranged to pass, say the lower sideband only, eliminating the carrier and the upper sideband. The signals then pass through the transmitting amplifier $A_1$ and through the separating filter $HP_1$ to the line. $LP_1$ is a further filter which separates the channel under consideration from another channel employing different frequencies. The oscillator $O_2$ which may, for example, be 34 kc. is used to control the carrier oscillator $O_1$. A small portion of the outputs of both $O_1$ and $O_2$ are transmitted to the transmission line through band pass filters $F_1$ and $F_2$ respectively which pass the frequencies of 42.5 and 34 kc. respectively. The method of connection to the line may be similar to that described in British Patent No. 513,229.

Figure 2:
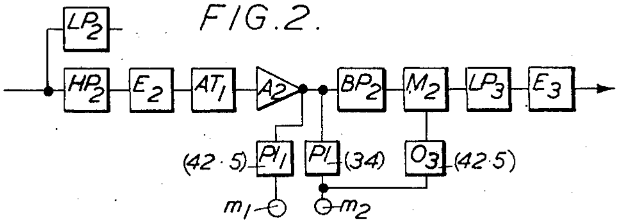
Fig. 2 is a schematic diagram of the receiving end.

At the receiving end the signals enter from the line and pass through the separating high and low pass filters $LP_2$ and $HP_2$ (Fig. 2) through the line equaliser $E_2$, the gain control attenuator $AT_1$ to the amplifier $A_2$. From $A_2$ the signals pass through the band-pass filter $BP_2$ to the modulator $M_2$ where they are demodulated by the frequency of 42.5 kc. from the oscillator $O_3$. The signals then pass through the low pass filter $LP_3$ and the equaliser $E_3$ to the voice frequency circuits. The pilot frequencies of 34 and 42.5 kc. are taken off at the output of the transmitting amplifier by the pilot indicators $PI_2$ and $PI_1$ respectively, the 34 kc. frequency being used to control the frequency of the carrier oscillator $O_3$. The pilot indicator devices $PI_2$, $PI_1$ may consist of very sharply tuned filters followed by amplifiers, followed again by rectifiers or alternatively may be any known type of apparatus suitable for these particular requirements. $M_1$ and $M_2$ are meters included in the rectifier circuits of $PI_1$ and $PI_2$ and operative to give visual indication of the pilot levels. From an inspection of these two meters it is then possible to determine the gain control and equalization variation that is necessary to correct the circuit. Alternatively the two pilot indicators may be made to control automatically the gain and equalisation correction, as will be described later.

In the above system, however, considerable practical difficulty would be experienced in separating the carrier frequency pilot from the side band since in a broadcast system the separation would only be approximately 30 cycles. The arrangement could, however, be used for systems other than broadcast systems in which the separation is greater.

Figure 3:
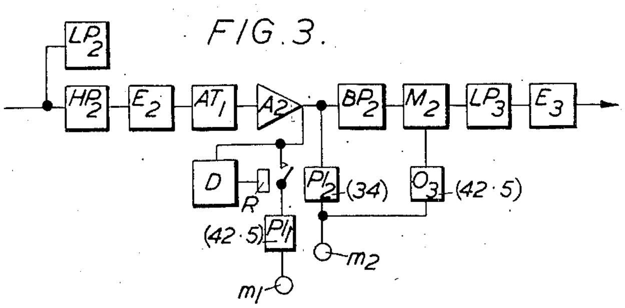
Fig. 3 is an alternative arrangement particularly suitable for broadcasting systems.

In order to overcome the above difficulty the arrangement shown in Fig. 3 may be used. In this figure much of the apparatus is similar to the apparatus of Fig. 2 and bears the same designations. The main difference, however, is that the pilot indicator $PI_1$, which receives the carrier frequency pilot, is only connnected to the receiving amplifier when the relay designated R is operated. This relay R is controlled by the device D which is a voice frequency operated device, and may be adjusted to operate the relay R only when the signals on the system have fallen below a pre-determined level. By this means the pilot indicator $PI_1$ is only connected to the line during periods when no signals are being transmitted, and no deterioration in quality will therefore result.

Figure 6:
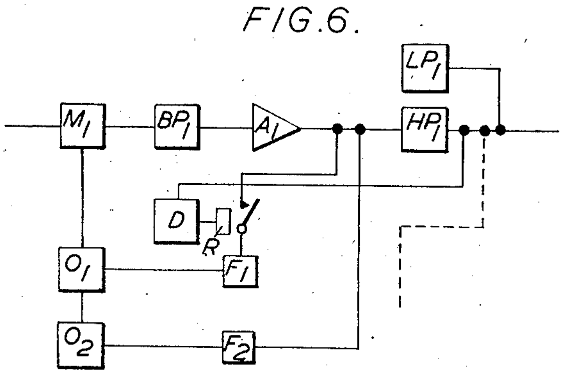
Figure 6 is a schematic diagram of a portion of the transmitting system.

Another method of operation is to arrange that at the transmitting end the carrier frequency pilot is only applied to the line when the signals on the system have fallen below a predetermined level. This may be effected by a circuit arrangement similar to that shown in Fig. 3, and is shown in Figure 6. If this arrangemennt is used a very much higher level of pilot current would then be possible without upsetting the system and the design of the receiving circuit for this pilot then becomes a much simpler matter and could probably be effected without any degradation in the quality of the signals received.

Figures 4, 5:
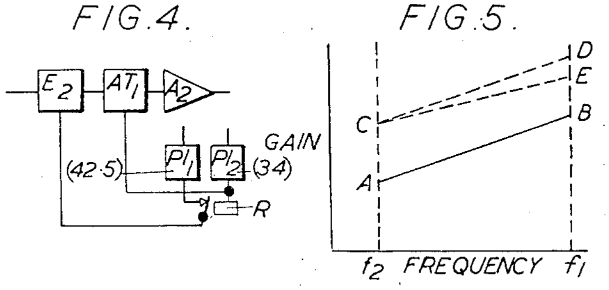
Fig. 4 is a schematic diagram of the receiving end illustrated in Fig. 3 employing automatic control of gain and equalisation.
Fig. 5 shows gain-frequency curves which will be referred to in the description.

In any of the above circuit arrangements automatic control of gain and equalisation may be effected by the circuit arrangement shown in Fig. 4. In this figure, the two pilot indicators $PI_1$ and $PI_2$ which may be any of the means previously described, are shown controlling the equaliser $E_2$ and the gain control $AT_1$ respectively. There are various known methods by which the pilot indicator may be made to vary the equalisation and gain of the system and any of these may be assumed to be used, the particular method not being relevant to the invention.

In cases in which any of the pilot frequencies are disabled during broadcast programme transmission either at the sending or receiving terminal, the associated equaliser or gain control circuits are so arranged that the gain control or equalisation mechanism remains in the setting to which it was last adjusted. The novel feature of Fig. 4, however, is that as soon as the current in $PI_2$ departs from the normal and correction starts taking place the relay R is operated, thereby preventing the pilot indicator $PI_1$ from controlling the equaliser $E_2$ until such time as the correction due to $PI_2$ is complete. Thus with reference to Fig. 5 the curve AB shows the gain-frequency characteristic of the amplifier which is required for a certain line condittion. Assume now that some change in the line takes place and the new required curve is given by CD. When the line constants change both $PI_1$ and $PI_2$ will tend to give correction, but $PI_1$ will be held inoperative until $PI_2$ has completed its operation. If then $PI_2$ is made to control the flat gain control $AT_1$, the amplification curve of the repeater will then be curve CE when $PI_2$ returns to normal and the relay R is released thereby allowing the pilot indicator $PI_1$ to operate on the equaliser $E_2$, giving the final curve CD. In practice, the amount of equalisation DE required at the highest frequency is usually small, with a result that the gain at the lowest frequency $f_2$ is hardly changed at all and $PI_2$ will remain on its normal setting.

If desired the equalisation and/or the gain control may be effected in the feedback path of the amplifier $A_2$ either by means of known mechanically controlled equalisers and attenuators or by any of the temperature control devices such as silver sulphide etc.

Figure 7:
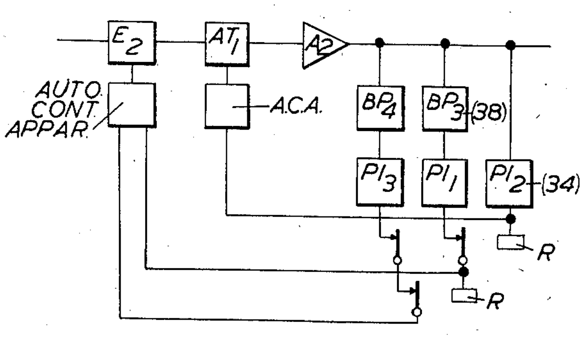
Figure 7 is a schematic diagram of a receiving system showing the intercontrol of a plurality of pilot frequencies.

It will be obvious from the above description to those skilled in the art that, if desired, the number of pilot frequencies may be increased thereby allowing more complete compensation to be obtained. Thus if three frequencies are used in connection with the particular system considered above, the third pilot may be 38 kc. (Fig. 7). In operation the three pilot receiving equipments may then be arranged so that flat gain correction is given first by the 34 kc. pilot, after which the 38 kc. pilot is allowed to operate to give equalisation correction up to 38 kc. and finally the 42.5 kc. pilot is allowed to give equalisation correction from 38 kc. to 42.5 kc. The three pilot receiving circuits would be arranged, according to the invention, to operate in a definite sequence by means of paralysing circuits as already described for the case in which two pilots are used. The number of pilots used may be extended indefinitely and they may be caused to operate in any desired order.

In the case of pilot frequencies lying inside the signal band it is, of course, essential that they should only be transmitted during such times when signals are not passing through the system. Under such conditions therefore, correction, if necessary, will occur during intervals in the transmission of the programme provided that such intervals last longer than the delay periods given to the various correction devices to prevent operation on surges or for other reasons.

In all the above systems it is desirable but not essential to allow one pilot frequency (lying outside the transmitted band) to be sent out continuously for use as a synchronising frequency between the master oscillators at each end of the system.

Having now particularly described and ascertained the nature of our said invention and in what manner the same is to be performed, we declare that what we claim is:

1. In an transmission system wherein signals at a plurality of pilot frequencies are employed to control electrical characteristics of the system, the plurality of frequencies being transmitted continuously, means responsive to one of said pilot signals for automatically changing a first characteristic of said system, means responsive to another of said signals for changing a second characteristic of said system and means responsive to one of said means for disabling the other of said means during change of a characteristic of the system by said one means.

2. In a transmission system wherein signals at a plurality of pilot frequencies are employed to control electrical characteristics of the system, the plurality of frequencies being transmitted continuously, means responsive to one of said pilot signals for automatically correcting the gain of said system, means responsive to another of said signals for automatically correcting the equalization of said system and means controlled by one of said means for disabling the other of said means during correction by said one means.

3. In a transmission system wherein signals at a plurality of pilot frequencies are employed to control electrical characteristics of the system, the plurality of frequencies being transmitted continuously, means responsive to one of said pilot signals for automatically controlling the gain of said system, means responsive to another of said signals for automatically controlling the equalization of said system and means controlled by said gain controlling means for disabling said equalization controlling means during change of gain by said gain controlling means.

4. In a transmission system wherein signals at a plurality of pilot frequencies are employed to control electrical characteristics of the system, the plurality of frequencies being transmitted continuously, means responsive to one of said pilot signals for automatically controlling the gain of said system, means responsive to another of said signals for automatically controlling the equalization of said system and means controlled by said gain controlling means for preventing control of said equalization during change of gain of said system by said gain controlling means.

5. In a transmission system wherein signals at a plurality of pilot frequencies are employed to control electrical characteristics of the system, the plurality of frequencies being transmitted continuously, means for controlling the gain of said system, means for controlling the equalization of said system and amplifier means all connected in series in said system and means connected with the output of said series connected means for controlling said gain controlling and said equalization controlling means comprising means responsive to one of said pilot signals for automatically varying said gain controlling means, means responsive to another of said pilot signals for automatically varying said equalization controlling means and means controlled by said first-mentioned varying means for preventing variation of said equalization controlling means during variation of said gain controlling means.

6. In a transmission system wherein signals at a plurality of pilot frequencies are employed to control electrical characteristics of the system, an amplifier for amplifying said signals and having feedback means for controlling the equalization of said system and for controlling the gain of said system, means connected to the output of said amplifier and responsive to one of said pilot signals for automatically varying said feedback means, means connected to the output of said amplifier and responsive to another of said pilot signals for automatically varying said feedback means and means controlled by said first-mentioned varying means for preventing variation of said feedback means by said second-mentioned varying means during operation of said first-mentioned varying means.

7. A transmission system employing signals at a plurality of pilot frequencies for controlling the electrical characteristics of said system and employing other signals for communication, said system comprising means responsive to one of said pilot signals for automatically effecting a control therein and means responsive to said communication signals for rendering said means responsive only when said communication signals fall below a predetermined level.

8. A transmission system employing carrier frequency side band signals for communication and signals at said carrier frequency for effecting a control on said system, said system comprising means responsive to said carrier signals for automatically effecting said control therein and means responsive to said communication signals for rendering said means operative only when said communication signals fall below a predetermined level.

FRANK CORAM WRIGHT.
KENNETH GEORGE HODGSON.
ALLEMAN HOLLY ROCHE.

REFERENCES CITED

The following references are of record in the file of this patent:

UNITED STATES PATENTS

| Number | Name | Date |
|---|---|---|
| 1,811,102 | Adams et al. | Sept. 10, 1924 |
| 1,784,176 | Carpe | Dec. 9, 1930 |
| 1,972,286 | Bjornson | Sept. 4, 1934 |
| 2,037,107 | Abraham | Apr. 14, 1936 |
| 2,083,666 | Potter | June 15, 1937 |
| 2,102,138 | Strieby | Dec. 14, 1937 |
| 2,105,809 | Duncan, Jr. | Jan. 18, 1938 |
| 2,326,871 | Mallinckrodt | Aug. 17, 1943 |

FOREIGN PATENTS

| Number | Country | Date |
|---|---|---|
| 436,635 | Great Britain | Oct. 15, 1935 |